US010823626B2

(12) United States Patent
Lefebvre et al.

(10) Patent No.: US 10,823,626 B2
(45) Date of Patent: Nov. 3, 2020

(54) STRAIN SENSOR PRINTING

(71) Applicant: General Electric Company, Schenectady, NY (US)

(72) Inventors: Louis Lefebvre, Valcourt (CA); Ehsan Toyserkani, Waterloo (CA); Chinedu Francis Dibia, Waterloo (CA); Elahe Jabari, Waterloo (CA); Jeremy Vandenberg, Brinston (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/371,959

(22) Filed: Apr. 1, 2019

(65) Prior Publication Data

US 2020/0309616 A1    Oct. 1, 2020

(51) Int. Cl.
| | |
|---|---|
| *B41J 2/125* | (2006.01) |
| *B41J 2/215* | (2006.01) |
| *C04B 41/88* | (2006.01) |
| *G01L 1/20* | (2006.01) |
| *G01B 7/16* | (2006.01) |
| *G01L 1/22* | (2006.01) |

(52) U.S. Cl.
CPC ............... *G01L 1/205* (2013.01); *B41J 2/125* (2013.01); *B41J 2/215* (2013.01); *G01B 7/16* (2013.01); *G01L 1/2287* (2013.01)

(58) Field of Classification Search
CPC ......... B41J 2/215; B41J 2/125; C09D 11/037; C09D 11/52; C04B 41/5133; C04B 41/5144; C04B 41/88; H01B 1/02; G01L 1/2281
See application file for complete search history.

(56) References Cited

U.S. PATENT DOCUMENTS

| | | | |
|---|---|---|---|
| 6,819,316 B2 | 11/2004 | Schulz et al. | |
| 9,618,403 B2 | 4/2017 | Li et al. | |
| 9,841,327 B2 | 12/2017 | Bottiglio et al. | |
| 9,939,247 B1 | 4/2018 | Dardona et al. | |
| 1,004,360 A1 | 8/2018 | Ng et al. | |
| 1,015,643 A1 | 12/2018 | Ray | |
| 2005/0093401 A1 | 5/2005 | Raisanen | |
| 2005/0235869 A1* | 10/2005 | Cruchon-Dupeyrat | B82Y 10/00 106/31.29 |
| 2016/0086069 A1* | 3/2016 | Tajima | G06F 8/654 358/1.14 |
| 2017/0226362 A1 | 8/2017 | Fratello et al. | |

* cited by examiner

*Primary Examiner* — Anh T Vo
(74) *Attorney, Agent, or Firm* — Hanley, Flight & Zimmerman, LLC

(57) ABSTRACT

A method for printing a strain sensor on a component using an aerosol ink includes depositing the aerosol ink on the component using a print head, the aerosol ink including chromium containing alloy particles; and monitoring a printing environment parameter to confirm the printing environment parameter is within a predetermined environmental range of a printing environment parameter baseline value while depositing the aerosol ink on the component using the print head.

20 Claims, 4 Drawing Sheets

STRAIN SENSOR PRINTING

FIELD

The present disclosure generally relates to a method for printing a strain sensor on a component using an aerosol ink, and a system for doing the same.

BACKGROUND

Determining a strain on a particular aspect of a component may allow, e.g., for installer of the component to confirm the component is installed correctly in the machine incorporating the component is operating properly, or for the manufacture to ensure that the component was designed appropriately to withstand operational forces. For example, greater than anticipated strain on the component a signal to the installer or manufacturer that the component is not properly installed or that it may wear out prematurely under normal operating conditions.

However, certain components of nonlinear and nonplanar geometries and loads that result in a nonuniform strain fields that may have relatively focused strain gradients. Conventional strain sensors having a predetermined shape and size may not be capable of determining the strain over such relatively focused strain gradients given that the conventional strain sensors return an average strain across the entirety of its size, or rather, its sensing area. Further, the nonlinear and nonplanar geometries may result in a relatively low, or varying, strain transfer ratio from the component to the strain sensor. Each of these issues may result in an inaccurate strain reading for the component.

Printing the strain sensors on the components may allow for increased flexibility in where the strain sensor is positioned, a size of the strain sensor, an orientation of the strain sensor, and a shape of the strain sensor. As such, printing the strain sensors may overcome many of the above issues with conventional strain sensors. However, the inventors of the present disclosure have discovered that printing strain sensors may result in an undesirably high level of variance between strain sensors. Accordingly, a system and method for printing strain sensors with a reduction in variance would be useful.

BRIEF DESCRIPTION

Aspects and advantages will be set forth in part in the following description, or may be obvious from the description, or may be learned through practice of the invention.

In an exemplary aspect of the present disclosure, a method for printing a strain sensor on a component using an aerosol ink is provided. The method includes depositing the aerosol ink on the component using a print head, the aerosol ink including chromium containing alloy particles; and monitoring a printing environment parameter to confirm the printing environment parameter is within a predetermined environmental range of a printing environment parameter baseline value while depositing the aerosol ink on the component using the print head.

In certain exemplary aspects the method further includes monitoring a temperature of the component to confirm the temperature within a predetermined temperature range of a baseline temperature value while depositing the aerosol ink on the component using the print head.

For example, in certain exemplary aspects monitoring the temperature of the component includes controlling the temperature of the component while depositing the aerosol ink on the component using the print head.

For example, in certain exemplary aspects the predetermined temperature range of the baseline temperature value is ten percent.

In certain exemplary aspects monitoring the printing environment parameter includes monitoring an ambient temperature, an ambient humidity, or both of the printing environment.

For example, in certain exemplary aspects monitoring the printing environment parameter further includes monitoring an atmospheric composition of the printing environment.

For example, in certain exemplary aspects depositing the aerosol ink on the component using the print head includes maintaining a print head velocity within a predetermined print head velocity range of a print head velocity baseline value.

For example, in certain exemplary aspects depositing the aerosol ink on the component using the print head further includes maintaining an aerosol ink droplet mass within a predetermined aerosol ink droplet mass range of an aerosol ink droplet mass baseline value and maintaining a print head nozzle gap distance within a predetermined print heat nozzle gap distance range of a print heat nozzle gap distance baseline value.

In certain exemplary aspects depositing the aerosol ink on the component using the print head includes depositing the aerosol ink on the component in a triple path configuration.

For example, in certain exemplary aspects the triple path configuration is formed of a first aerosol ink deposition line defining a line width and a line center, a second aerosol ink deposition line, and a third aerosol ink deposition line, and wherein the second and third aerosol ink deposition lines are offset from the first aerosol ink deposition line by between 0% and 99% of the line width relative to the line center.

In certain exemplary aspects the component is a first component, wherein depositing the aerosol ink on the component using the print head includes printing a first strain sensor on the first component and printing a second strain sensor on a second component, and wherein the first strain sensor defines a variability with the second strain sensor less than one percent.

For example, in certain exemplary aspects printing the first strain sensor on the first component includes printing the first strain sensor on the first component during a first printing process, wherein printing the second strain sensor on the second component includes printing the second strain sensor on the second component during a second printing process, and wherein the first printing process is separate and distinct from the first printing process.

The method of claim 1, wherein depositing the aerosol ink on the component using the print head includes printing a first strain sensor on the component and printing a second strain sensor on the component, and wherein the first strain sensor defines a variability with the second strain sensor less than one percent.

In an exemplary embodiment of the present disclosure, a system is provided for printing a strain sensor on a component using an aerosol ink. The system includes a printer including an atomizer and a print heat fluidly connected to the atomizer for receiving an aerosol ink from the atomizer, the aerosol ink including chromium containing alloy particles; a printing environment parameter sensor for sensing a printing environment parameter; and a control system operable with the printer and the printing environment parameter sensor. The control system includes one or more processors and memory, the memory storing instructions that, when executed by the one or more processors, cause the system to deposit the aerosol ink on the component using the print head; and monitor a printing environment parameter to confirm the printing environment parameter is within a predetermined environmental range of a printing environment parameter baseline value while depositing the aerosol ink on the component using the print head.

In certain exemplary embodiments the control system is further configured to cause the system to monitor a temperature of the component to confirm the temperature within a predetermined temperature range of a baseline temperature value while depositing the aerosol ink on the component using the print head.

For example, in certain exemplary embodiments in monitoring the temperature of the component the control system is configured to cause the system to control the temperature of the component while depositing the aerosol ink on the component using the print head.

In certain exemplary embodiments the printing environment parameter is an ambient temperature, an ambient humidity, or both of the printing environment.

In certain exemplary embodiments the printing environment parameter includes an ambient temperature and an ambient humidity of the printing environment.

In certain exemplary embodiments the printing environment parameter further includes an atmospheric composition of the printing environment.

In certain exemplary embodiments in depositing the aerosol ink on the component using the print head the control system is configured to cause the system to deposit the aerosol ink on the component in a triple path configuration.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
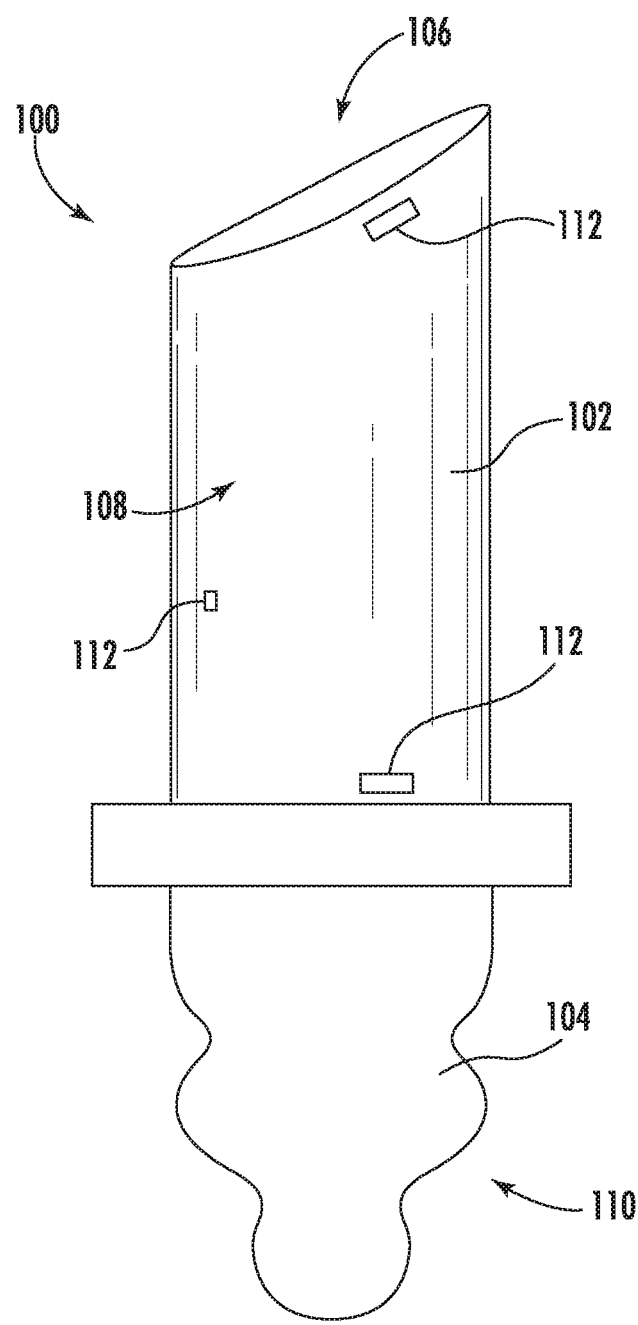
FIG. 1 shows a component in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one feature from another and are not intended to signify importance of the individual components.

A system and method for printing a strain sensor on a component using an aerosol ink is generally provided. The system and method may provide for relatively low variability between printed strain sensors. Notably, the strain sensor may be printed using an aerosol ink having chromium containing alloy particles/nanoparticles, palladium containing alloy particles/nanoparticles, or both. The system and method generally includes depositing the aerosol ink on the component using a printhead, and monitoring a printing environment parameter to confirm the printing environment parameter is within a predetermined environmental range of a printing environment parameter baseline value while depositing the aerosol ink on the component using the printhead. The printing environment parameter may be an ambient humidity within the printing environment, an ambient temperature within the printing environment, an atmospheric composition within the printing environment, a barometric pressure within the printing environment, or a combination of these parameters. In addition, the system and method may control a temperature of the component on which the strain sensor is printed to maintain the temperature of the component within a predetermined temperature range of a baseline temperature value while depositing the aerosol ink on the component using the printhead. Such a system and method may provide for a relatively low variability between printed strain sensors. Specifically, the inventors of the present disclosure have found that maintaining one or more of the printing environment parameters consistent between printing operations may lead to a relatively low variability between printed strain sensors when an aerosol ink having chromium and/or palladium containing alloy particles is used.

Further, it will be appreciated that by printing the strain sensors on the components, the strain sensors may have a lower profile. Such may facilitate, at least in part, utilization of the strain sensors in aerodynamic tests, such as strain testing on a rotor blade, such as a turbine rotor blade, such as a suction side of a turbine rotor blade (or any other aerodynamic surface).

Referring now to the Figures, FIG. 1 depicts a component in accordance with an exemplary aspect of the present disclosure on which one or more strain sensors may be printed. For the embodiment shown, the component is a rotor blade 100, such as a compressor rotor blade or a turbine rotor blade, as may be incorporated into a gas turbine engine. The rotor blade 100 includes an airfoil 102 and a base 104. The airfoil 102 defines a pressure side 106 and a suction side 108. Each of the pressure side 106 and suction side 108 are, for the embodiment depicted, non-linear and non-planar geometries. Similarly, the base 104 of the rotor blade 100 includes non-linear and non-planar geometries as well. For example, the base 104 includes a dovetail section 110, which as will be appreciated may assist with the installation of the rotor blade 100. Further, for exemplary purposes, the rotor blade 100 depicts a plurality of strain sensors 112 positioned thereon, and more specifically, printed thereon. The strain sensors 112 each have unique sizes, shapes, orientations, and placements.

As will be discussed below, the system and method of the present disclosure may facilitate printing strain sensors 112 on a plurality of such rotor blades 100 with relatively low variability between the strain sensors 112 on each of the respective rotor blades 100.

Figure 2:
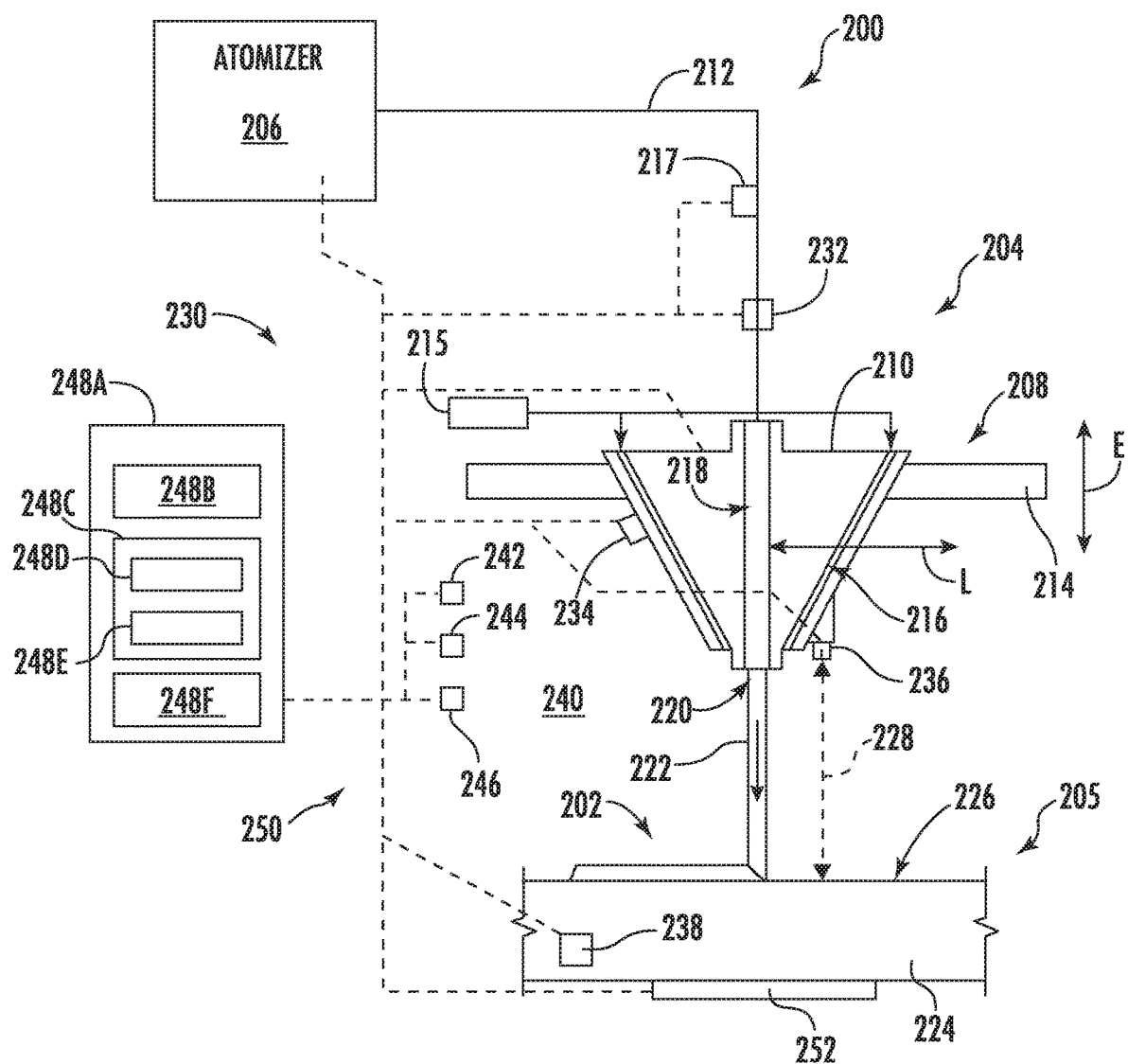
FIG. 2 shows system for printing a strain sensor on a component in accordance with an exemplary embodiment of the present disclosure.

Referring now to FIG. 2, a system 200 for printing a strain sensor 202 on a component 205 using an aerosol ink is provided. For example, the system 200 may be utilized to print the one or more strain sensors 112 on the rotor blade 100 described above with reference to FIG. 1 (which may be similar to the strain sensors 202 discussed herein below). Alternatively, the system 200 may be utilized to print one or more strain sensors 202 on any other suitable component 205. Further, will be appreciated, that as used herein, the term "component 205" is used generically to refer to any part, subpart, etc. of a machine, as well as to any standalone part, substrate, platform, etc.

The exemplary system 200 of FIG. 2 generally includes a printer 204 having an atomizer 206 and a printhead assembly 208. The printhead assembly 208 includes a printhead 210 fluidly connected to the atomizer 206 for receiving an aerosol ink from the atomizer 206. The atomizer 206 may be any suitable component 205 capable of generating a relatively dense mist of material-laden droplets, i.e., the aerosol ink. The material-laden droplets/aerosol ink generated by the atomizer 206 and provided through the printhead assembly 208 (discussed in more detail below) may be nanoparticles. The term "nanoparticles" refers to particles having a maximum dimension of 100 nonometers ("nm"). In particular embodiments, the nanoparticles may have a maximum dimension of 25 nm to 100 nm (e.g., 50 nm to 100 nm).

For the embodiment depicted, the atomizer 206 is fluidly connected to the printhead 210 through a supply line 212. As such, the atomizer 206 and printhead 210 are separate components 205 for the embodiment shown. However, in other embodiments, the atomizer 206 may be incorporated into, or otherwise formed integrally with, the printhead 210.

Referring still to FIG. 2, the printhead assembly 208 includes a track 214, with the printhead 210 movably coupled to the track 214. Although not depicted, the printhead assembly 208 may include one or more motors for moving the printhead 210 in a lateral direction L along the track 214. It will further be appreciated that for the embodiment shown, the movable connection between the printhead 210 the track 214 further allows for the printhead 210 to move in a transverse direction (not shown in FIG. 2; a direction perpendicular to the plane depicted in FIG. 2) and an extension direction E, perpendicular to both the transverse direction and the lateral direction L. In such a manner, the system 200 may be capable of moving the printhead 210 along substantially any three-dimensional path. Alternatively, in other embodiments, any other suitable assembly may be provided for moving the printhead 210 relative to the component 205 (or the component 205 relative to the printhead 210).

Moreover, the exemplary printhead 210 depicted further defines one or more sheath gas paths 216, an aerosol ink path 218, and an aerosol ink outlet 220. The printhead 210 may receive pressurized sheath gas through the one or more sheath gas paths 216 from a sheath gas source 215. The sheath gas source 215 may control a mass flow of the sheath gas provided to the one or more sheath gas paths 216. Notably, for the embodiment depicted, the system 200 further includes a gas flow controller 217. The gas flow controller 217 is, for the embodiment shown, operable with the supply line 212, for controlling a mass flow of a gas therethrough. For example, the gas flow controller 217 may include one or more valves. Alternatively, however, the gas flow controller 217 may be incorporated into one or both of the atomizer 206 or the printhead 210. Alternatively, still, control of the sheath gas source 215 may act as the mass flow controller for the flow through printhead 210.

Further, the printhead 210 may provide aerosol ink received through the supply line 212 through the aerosol ink path 218 to the aerosol ink outlet 220. The printhead 210 may further be configured to surround an aerosol ink deposition path 222 provided through the aerosol ink outlet 220 of the printhead 210 with a substantially annular sheath gas ring during operation. Such may allow the aerosol ink deposition path 222 to be relatively concentrated for printing the one or more strain sensors on the component 205, as will be described in more detail below.

The system 200 is further operable with a platform (not shown) to which the component 205 is mounted. The exemplary component 205 depicted in FIG. 2 includes a component wall 224 defining a component outer surface 226. The printhead 210 defines a printhead nozzle gap distance 228 with the outer surface 226 of the component wall 224. As will be explained in more detail below, the printhead nozzle gap distance 228 may be controlled to ensure an aerosol ink flow (along the deposition path 222) through the aerosol ink outlet 220 of the printhead 210 reaches the outer surface 226 of the component wall 224 in a desired manner.

In such a manner it will be appreciated that the printer 204 may deposit aerosol ink on the component 205 using the printhead 210 by delivering the aerosol ink along the deposition path 222 from the aerosol ink outlet 220 of the printhead 210 to the outer surface 226 of the component wall 224. Further, in such a manner it will be appreciated that the printer 204 may "print" features on the outer surface 226 of the component wall 224, such as the one or more strain sensors 202.

Moreover, as briefly noted above, aerosol inks that may be utilized with the present disclosure are generally aerosol inks that include chromium-based metallic nanoparticles. Generally, chromium-based metallic nanoparticles have different properties compared to their bulk counterparts. Chromium-based metallic nanoparticles have properties that may be dependent on the particle size. For example, it is well-known that chromium-based metallic nanoparticles absorb light and can have melting points well below their bulk materials counterparts. The wavelength of the absorbance spectrum becomes shorter as the particle size decreases. This is a function of increased surface energy of the smaller particles. Further, the shape of the chromium-based metallic nanoparticles may vary based on the desired printing application. For example, in certain embodiments, the chromium-based metallic nanoparticles may have a substantially spheroidal shape. In other embodiments, the chromium-based metallic nanoparticles may be flake-like shapes or other irregular shapes. Further, still the chromium-based metallic nanoparticles may generally include chromium mixed with at least one alloying element. For example, suitable alloying elements 272 may include palladium, copper, nickel, platinum, gold, silver, iron, titanium, indium tin oxide, cobalt, rhodium, tungsten, or mixtures thereof. Moreover, in particular embodiments, the chromium-based metallic nanoparticles may be purified before being mixed to form the aerosol ink. Such a purification process may be configured to remove contaminants and other materials that may poison the resulting aerosol ink composition. For example, reactive materials may be removed from the chromium-based metallic nanoparticles.

The chromium-based metallic nanoparticles may be loaded to a maximum solvable amount. For example, the plurality of chromium-based metallic nanoparticles may be present in a loading amount of 5% to 30% by weight of the total aerosol ink (e.g., 5% to 10% by weight), or alternatively in any other suitable loading amount (e.g., less than 5% or greater than 30% by weight of the total aerosol ink). The solvent system may generally have a viscosity of 0.5 cP to 1000 cP (e.g., a viscosity of 1 cP to 3 cP), or alternatively any other suitable viscosity. This relatively high viscosity allows for stabilization of the chromium-based metallic nanoparticles against gravitational settling. In one embodiment, the solvent system includes at least two solvents that are miscible with each other. Alternatively, however, any other suitable number of solvents may be used.

Moreover, as is also depicted in FIG. 2, the exemplary system 200 for printing the strain sensor 202 on the component 205 depicted includes a one or more sensors and a control system 230 operable with the printer 204 and the one or more sensors. More specifically, for the exemplary embodiment depicted, the one or more sensors includes an aerosol ink sensor 232 for sensing data indicative of one or more parameters of the aerosol ink (e.g., aerosol ink flow rate, aerosol ink temperature, aerosol ink droplet size, etc.); a printhead movement sensor 234 for sensing data indicative of movement of the printhead 210 (e.g., a printhead velocity along one or more of the lateral direction L, transverse direction, and/or extension direction E); a printhead position sensor 236 for sensing data indicative of a position of the printhead 210 relative to, e.g., the outer surface 226 of the component 205 (e.g., data indicative of a nozzle gap distance 228); a component sensor 238 for sensing data indicative of one or more parameters of the component 205 (e.g., data indicative of a temperature of the component 205); and a plurality of printing environment parameter sensors positioned within a printing environment 240 of the printer 204. More specifically, the plurality printing environment parameter sensors includes a printing environment temperature sensor 242 for sensing data indicative of a temperature within the printing environment 240, a printing environment humidity sensor 244 for sensing data indicative of a humidity within the printing environment 240, and a printing environment atmospheric composition sensor 246 sensing data indicative of an atmospheric composition within the printing environment 240. It will further be appreciated that in certain embodiments, the system 200 may include other sensors for sensing other aspects of, e.g., the printing environment 240. For example, in certain exemplary embodiments, the system 200 may include a sensor for sensing an air flow rate within the printing environment 240, a vibration of the component 205 and/or of one or more aspects of the system 200, etc. The air flow rate may be a result of a ventilation system. Notably, as used herein, the term "printing environment" refers to an area surrounding the printhead 210 having conditions substantially equal to, or substantially consistent relative to, the area surrounding the aerosol ink deposition path 222 between the printhead 210 and the outer surface 226 of the component 205.

As noted, the control system 230 is operable with the one or more sensors. The control system 230 generally includes one or more computing devices 248A. The exemplary computing device(s) 248A depicted include one or more processor(s) 248B and one or more memory device(s) 248C. The one or more processor(s) 248B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 248C can include one or more non-transitory computer-readable storage medium(s), such as RAM, ROM, EEPROM, EPROM, flash memory devices, magnetic disks, etc., and/or combinations thereof.

The memory device(s) 248C can include one or more computer-readable media and can store information accessible by the one or more processor(s) 248B, including instructions 248D that can be executed by the one or more processor(s) 248B. For instance, the memory device(s) 248C can store instructions 248D for running one or more software applications, displaying a user interface, receiving user input, processing user input, etc. In some implementations, the instructions 248D can be executed by the one or more processor(s) 248B to cause the one or more processor(s) 248B to perform operations, e.g., such as one or more portions of methods described herein. The instructions 248D can be software written in any suitable programming language or can be implemented in hardware. Additionally, and/or alternatively, the instructions 248D can be executed in logically and/or virtually separate threads on processor(s) 248B.

The one or more memory device(s) 248C can also store data 248E that can be retrieved, manipulated, created, or stored by the one or more processor(s) 248B. The data 248E can include, for instance, data to facilitate performance of methods described herein. The data 248E can be stored in one or more database(s) locally, or alternatively at a remote location and connected to control system 230 by a high bandwidth LAN or WAN, or can also be connected to controller through network(s) (not shown). The one or more database(s) can be split up so that they are located in multiple locales. In some implementations, the data 248E can be received from another device.

The computing device(s) 248A depicted also includes a communication module or interface 248F used to communicate with one or more other component(s) of control system 230 or overall system 200 over the network(s). The communication interface 248F can include any suitable components for interfacing with one or more network(s), including for example, transmitters, receivers, ports, controllers, antennas, or other suitable components. More specifically, for the exemplary aspect depicted, the communications interface 248F is operable with a wireless communication network 250.

Referring still to FIG. 2, the control system 230 is operable with the one or more sensors through the communications interface 248F and the wireless communication network 250. In such a manner, the control system 230 may receive data from the one or more sensors 232, 234, 236, 238, 242, 244, 246, such as data indicative of the various parameters discussed above. Moreover, as is also depicted in FIG. 2, the control system 230 is operable with various components 205 of the printer 204 through the communications interface 248F and the wireless communication network 250. For example, the control system 230 is operable with the printhead assembly 208 and the atomizer 206. As such, the control system 230 may be configured to control various aspects of the printhead 210, such as a printhead velocity, a printhead print path, an aerosol ink flowrate/droplet size, etc.

In addition, the exemplary system 200 of FIG. 2 includes one or more features for controlling a component parameter of the component 205. More specifically, the system 200 of FIG. 2 includes one or more features for controlling a temperature of the component 205, such as a temperature of the wall 224 of the component 205, and more specifically of the outer surface 226 of the wall 224 of the component 205. For the embodiment shown, the one or more features is a heater 252 thermally coupled to the component 205 and operably coupled to the control system 230. The heater 252 may be controlled to maintain a temperature of the outer surface 226 of the component within a desired operating temperature range during printing operations of the system 200. It will further be appreciated that in certain exemplary aspects, the control system 230 may be operably coupled to a ventilation system for controlling an air flow rate within the printing environment 240.

As will be discussed in greater detail below with reference to the method 300 of FIG. 6, the exemplary system 200 for printing the strain sensor 202 of the component 205 discussed with reference to FIG. 2 may accordingly control and/or monitor the various printing parameters to ensure the strain sensor 202 being printed is done so in a manner to facilitate a desired level of consistency between printing operations (and reduce a variability between separately printed strain sensors 202 on a single component 205 or across multiple components 205). Moreover, the exemplary system 200 for printing the strain sensor 202 of the component 205 discussed above may allow for various printing configurations to further assist with obtaining a desired level of consistency between prints and a reduction in variability between separately printed strain sensors 202.

Figure 3:
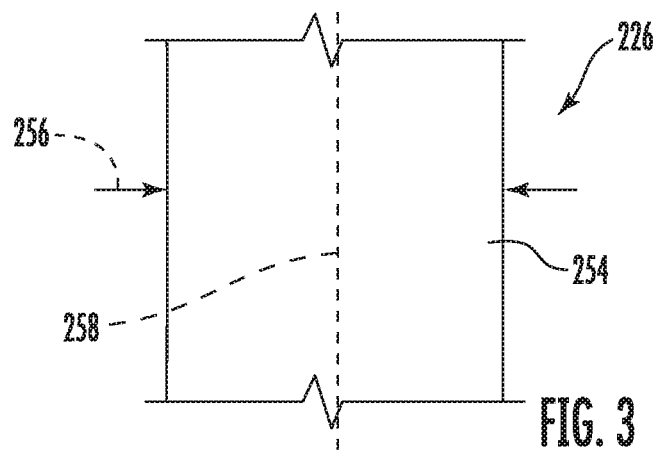
FIG. 3 shows a first print path in accordance with an exemplary embodiment of the present disclosure.
Figure 4:
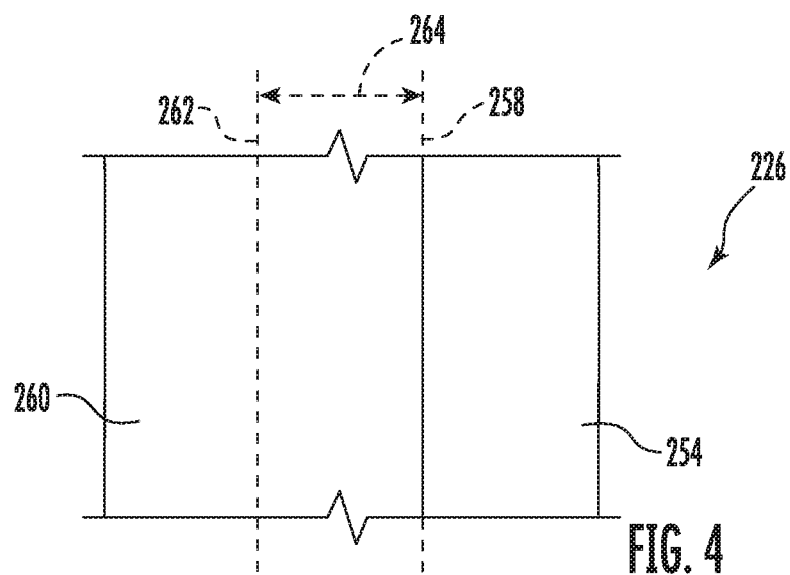
FIG. 4 shows a second print path along with the first print path of FIG. 3 in accordance with an exemplary embodiment of the present disclosure.

For example, referring now briefly to FIGS. 3 through 5, one such printing configuration/printing path will be described. Referring first to FIG. 3, a schematic, overhead view is depicted of a first aerosol ink deposition line 254. The first aerosol ink deposition line 254 defines a line width 256, as well as a centerline 258. The first aerosol ink deposition line 254 follows a desired path. Additionally, referring now to FIG. 4, the first aerosol ink deposition line 254 is depicted, along with a second aerosol ink deposition line 260. The second aerosol ink deposition line 260 is offset from the first aerosol ink deposition line 254 relative to the centerline 258 of the first aerosol ink deposition line 254. More specifically, the second aerosol ink deposition line 260 defines a centerline 262, with an offset 264 being defined between the centerlines 258, 262 of the first and second aerosol ink deposition lines 254, 260.

Figure 5:
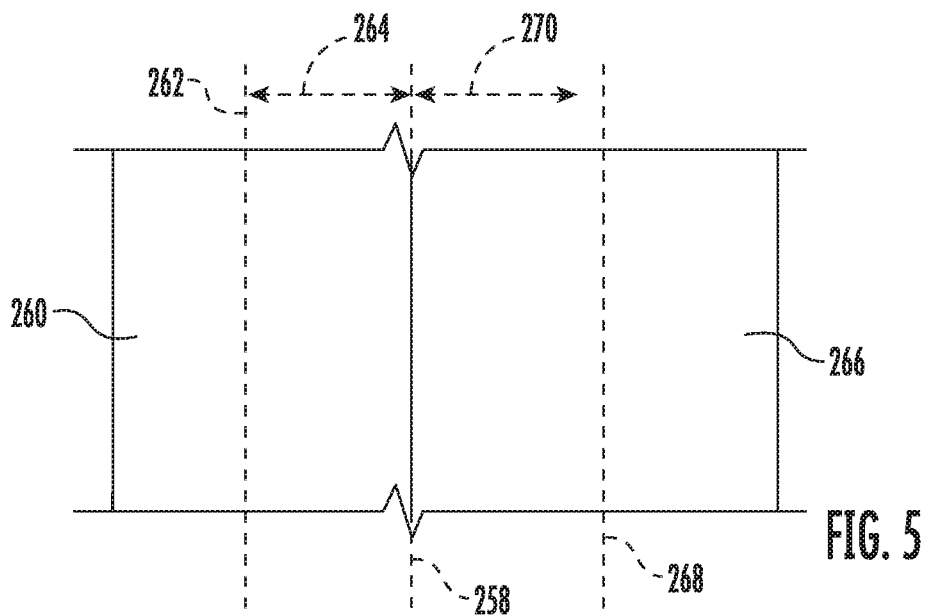
FIG. 5 shows a third print path along with the first and second print paths of FIG. 2 in accordance with an exemplary embodiment of the present disclosure.

Moreover, referring now to FIG. 5, the first and second aerosol ink deposition lines 254, 260 are depicted along with a third aerosol ink deposition line 266. The third aerosol ink deposition line 266 is also offset from the first aerosol ink deposition line 254 relative to the centerline 258 of the first aerosol ink deposition line 254. The third aerosol ink deposition line 266 is offset in a direction opposite from the second aerosol ink deposition line 260 from the first aerosol ink deposition line 254. More specifically, as with the second aerosol ink deposition line 260, the third aerosol ink deposition line 266 defines a centerline 268, with an offset 270 being defined between the centerlines 258, 268 of the first and third aerosol ink deposition lines 254, 266.

For the embodiment depicted, the second and third aerosol ink deposition line 260, 266 are offset from the first aerosol ink deposition line 254 in opposite directions by between twenty-five percent and seventy-five percent of the line width 256 relative to the centerline 258 of the first aerosol and deposition line. More specifically, for the embodiment depicted, the second and third aerosol ink deposition lines 260, 266 are offset from the first aerosol ink deposition line 254 in opposite directions by about fifty percent of the line width 256 relative to the centerline 258 of the first aerosol and deposition line. However, in other exemplary aspects, the second and third aerosol ink deposition line 260, 266 may be offset from the first aerosol ink deposition line 254 in opposite directions by between zero percent (i.e., not offset) and ninety-nine percent.

Such a configuration may result in a relatively consistent path for, e.g., the strain sensor 202 being printed by the printer 204. Such may accordingly contribute to an increase in consistency and a decrease in variability between separately printed strain sensors 202 on the same component 205 or on different components 205.

Figure 6:
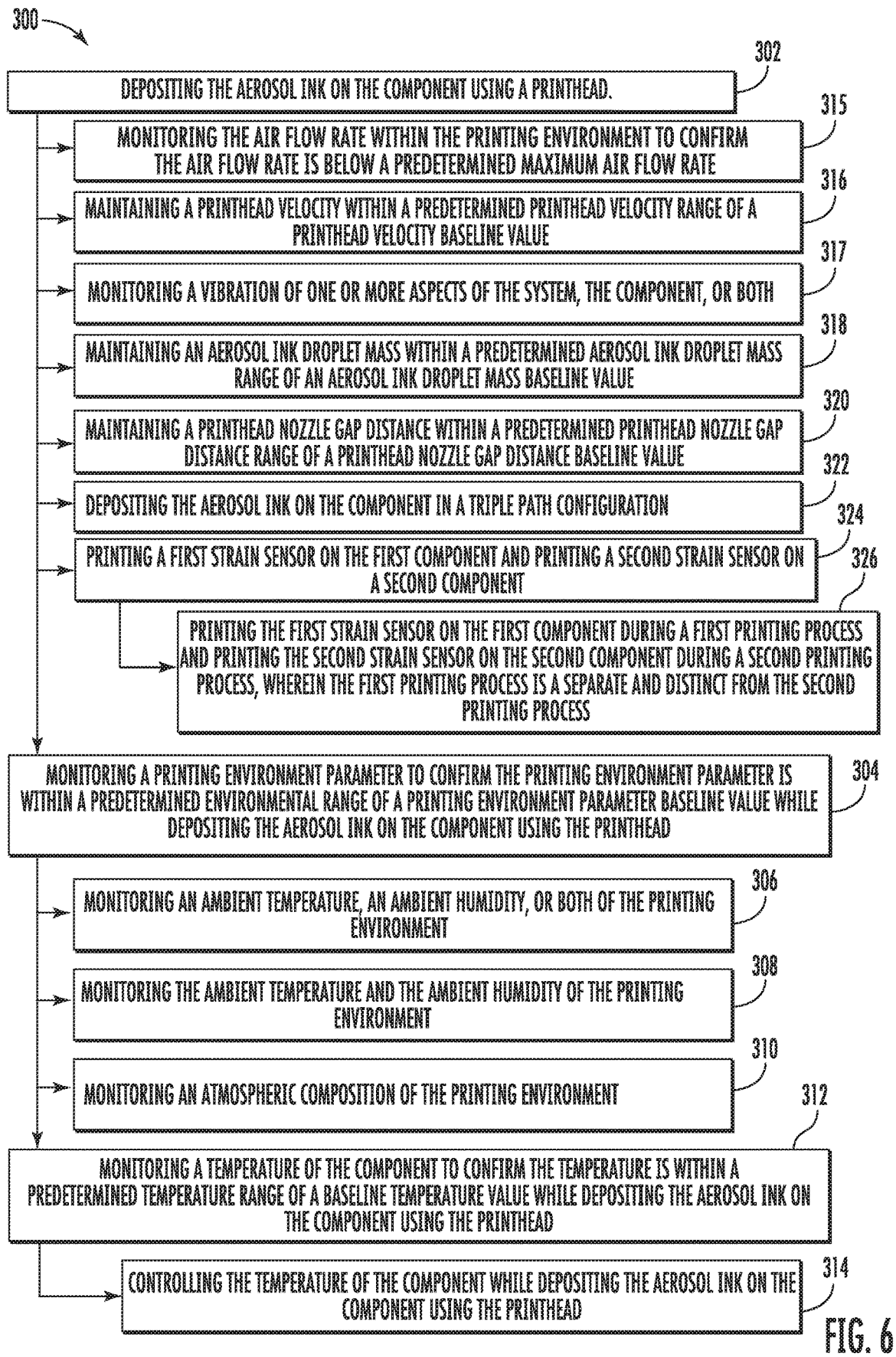
FIG. 6 shows a flow diagram of a method for printing a strain sensor on a component using an aerosol ink in accordance with an exemplary aspect of the present disclosure.

Referring now to FIG. 6, a method 300 for printing the strain sensor on a component using an aerosol ink is provided. The method 300 may utilize one or more of the exemplary systems discussed above.

The method 300 includes at (302) depositing the aerosol ink on the component using a printhead. The aerosol ink includes chromium containing alloy particles. The method 300 further includes at (304) monitoring a printing environment parameter to confirm the printing environment parameter is within a predetermined environmental range of a printing environment parameter baseline value while depositing the aerosol ink on the component using the printhead at (302). In certain exemplary aspects, the predetermined environmental range may be ten percent of the printing environment parameter baseline value. Further, the printing environment parameter baseline value may be a predetermined preferred printing environment parameter value.

More specifically, for the exemplary aspect depicted, monitoring the printing environment parameter at (304) includes at (306) monitoring an ambient temperature, an ambient humidity, or both of the printing environment. For example, in certain exemplary aspects, monitoring the printing environment parameter at (304) includes at (308) monitoring the ambient temperature and the ambient humidity of the printing environment. Further, in certain exemplary aspects, such as the exemplary aspect depicted, monitoring the printing environment parameter at (304) further includes at (310) monitoring an atmospheric composition of the printing environment. As will be appreciated, the one or more printing environment parameters may affect aspects of the aerosol ink having chromium containing alloy particles. In particular, the inventors of the present disclosure have discovered that one or more of the above-identified printing environment parameters have a particular effect on the results of a strain sensor printed in accordance with the method 300 by virtue of the aerosol ink having chromium containing alloy particles. By monitoring one or more these printing environment parameters at (304), the method 300 may ensure the strain sensors printed through the deposition of the aerosol ink at (302) have a desired level of consistency, with a minimum amount of variability.

Moreover, for the exemplary aspect depicted, other aspects of the printing process may be controlled and/or monitored to further reduce a variability in the strain sensors. Specifically, for the exemplary aspect depicted, the method 300 further includes at (312) monitoring a temperature of the component to confirm the temperature is within a predetermined temperature range of a baseline temperature value while depositing the aerosol ink on the component using the printhead at (302). For example, controlling the temperature of the component at (312) includes, for the exemplary aspect depicted, at (314) controlling the temperature of the component while depositing the aerosol ink on the component using the printhead at (302). In certain exemplary aspects, the predetermined temperature range of the baseline temperature value may be ten percent of the baseline value. Further, the baseline value may be a predetermined preferred temperature value for the component.

Further, for the exemplary aspect depicted, the method 300 includes at (315) monitoring the air flow rate within the printing environment to confirm the air flow rate is below a predetermined maximum air flow rate, and at (317) monitoring a vibration of one or more aspects of the system, the component, or both. In certain aspects, monitoring the air flow rate within the printing environment at (315) may include controlling a ventilation system of the system or environment within which the system is located, and monitoring a vibration of one or more aspects of the system, the component, or both at (317) may include monitoring a vibration of one or more aspects of the system, the component, or both to ensure the vibration is less than about 5 micrometers in amplitude.

Further still, for the exemplary aspect depicted, the aerosol ink may be deposited at (302) in a manner to provide a desired consistency between printing operations. For example, for the exemplary aspect depicted, depositing the aerosol ink on the component at (302) includes at (316) maintaining a printhead velocity within a predetermined printhead velocity range of a printhead velocity baseline value; at (318) maintaining an aerosol ink droplet mass within a predetermined aerosol ink droplet mass range of an aerosol ink droplet mass baseline value; and at (320) maintaining a printhead nozzle gap distance within a predetermined printhead nozzle gap distance range of a printhead nozzle gap distance baseline value. Each of the above respective ranges may be ten percent of the respective baseline values, and each of the respective baseline values may be a predetermined preferred parameter value.

Further, still, for the exemplary aspect depicted, the strain sensor may be printed in a manner to ensure a desired level of consistency. More specifically, for the exemplary aspect depicted, depositing the aerosol ink on the component using the printhead at (302) includes at (322) depositing the aerosol ink on the component in a triple path configuration. The triple path configuration is formed of a first aerosol ink deposition line defining a line width and a line center, a second aerosol ink deposition line, and a third aerosol ink deposition line. The second and third aerosol ink deposition lines are offset from the first aerosol ink deposition line by between twenty-five percent and seventy-five percent of the line width relative to the line center.

A strain sensor printed on a component in accordance with one or more of the above exemplary aspects may provide for a desired level of consistency and variability between strain sensors. For example, in certain exemplary aspects, the component may be a first component. With such an exemplary aspect, depositing the aerosol ink on the component using the printhead at (302) includes at (324) printing a first strain sensor on the first component and printing a second strain sensor on a second component. The first strain sensor may define a variability with the second strain sensor less than one (1) percent. As used herein, the term "variability" with reference to multiple strain sensors refers to a variance between a sensed strain of the various strain sensors, controlling for all other parameters.

Notably, with such an exemplary aspect, printing the first strain sensor on the first component and the second strain sensor on the second component at (324) includes at (326) printing the first strain sensor on the first component during a first printing process and printing the second strain sensor on the second component during a second printing process, wherein the first printing process is separate and distinct from the second printing process. For example, the printer may be shut down between the first printing process and the second printing process.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for printing a strain sensor on a component using an aerosol ink, the method comprising:

depositing the aerosol ink on the component using a print head, the aerosol ink comprising chromium containing alloy particles; and monitoring a printing environment parameter associated with printing environment conditions to confirm the printing environment parameter is within a predetermined environmental range of a printing environment parameter baseline value while depositing the aerosol ink on the component using the print head, the printing environment parameter baseline value a predetermined preferred printing environment parameter value within the predetermined environmental range, the monitoring including monitoring an atmospheric composition of the printing environment.

2. The method of claim 1, further comprising:

monitoring a temperature of the component to confirm the temperature within a predetermined temperature range of a baseline temperature value while depositing the aerosol ink on the component using the print head.

3. The method of claim 2, wherein monitoring the temperature of the component comprises controlling the temperature of the component while depositing the aerosol ink on the component using the print head.

4. The method of claim 2, wherein the predetermined temperature range of the baseline temperature value is ten percent.

5. The method of claim 1, wherein monitoring the printing environment parameter comprises monitoring an ambient temperature, an ambient humidity, or both of the printing environment.

6. The method of claim 1, further including removing a contaminant from the aerosol ink.

7. The method of claim 1, wherein depositing the aerosol ink on the component using the print head comprises maintaining a print head velocity within a predetermined print head velocity range of a print head velocity baseline value.

8. The method of claim 7, wherein depositing the aerosol ink on the component using the print head further comprises maintaining an aerosol ink droplet mass within a predetermined aerosol ink droplet mass range of an aerosol ink droplet mass baseline value and maintaining a print head nozzle gap distance within a predetermined print head nozzle gap distance range of a print head nozzle gap distance baseline value.

9. The method of claim 1, wherein depositing the aerosol ink on the component using the print head comprises depositing the aerosol ink on the component in a triple path configuration.

10. The method of claim 9, wherein the triple path configuration is formed of a first aerosol ink deposition line defining a line width and a line center, a second aerosol ink deposition line, and a third aerosol ink deposition line, and wherein the second and third aerosol ink deposition lines are offset from the first aerosol ink deposition line by between 0% and 99% of the line width relative to the line center.

11. The method of claim 1, wherein the component is a first component, wherein depositing the aerosol ink on the component using the print head comprises printing a first strain sensor on the first component and printing a second strain sensor on a second component, and wherein the first strain sensor defines a variability with the second strain sensor less than one percent.

12. The method of claim 11, wherein printing the first strain sensor on the first component comprises printing the first strain sensor on the first component during a first printing process, wherein printing the second strain sensor on the second component comprises printing the second strain sensor on the second component during a second printing process, and wherein the first printing process is separate and distinct from the first printing process.

13. The method of claim 1, wherein depositing the aerosol ink on the component using the print head comprises printing a first strain sensor on the component and printing a second strain sensor on the component, and wherein the first strain sensor defines a variability with the second strain sensor less than one percent.

14. A system for printing a strain sensor on a component using an aerosol ink, the system comprising:
 a printer comprising an atomizer and a print head fluidly connected to the atomizer for receiving an aerosol ink from the atomizer, the aerosol ink comprising chromium containing alloy particles;
 a printing environment parameter sensor for sensing a printing environment parameter; and
 a control system operable with the printer and the printing environment parameter sensor, the control system comprising one or more processors and memory, the memory storing instructions that, when executed by the one or more processors, cause the system to
  deposit the aerosol ink on the component using the print head; and
  monitor a printing environment parameter associated with printing environment conditions to confirm the printing environment parameter is within a predetermined environmental range of a printing environment parameter baseline value while depositing the aerosol ink on the component using the print head, the printing environment parameter baseline value a predetermined preferred printing environment parameter value within the predetermined environmental range.

15. The system of claim 14, wherein the control system is further configured to cause the system to monitor a temperature of the component to confirm the temperature within a predetermined temperature range of a baseline temperature value while depositing the aerosol ink on the component using the print head.

16. The system of claim 15, wherein in monitoring the temperature of the component the control system is configured to cause the system to control the temperature of the component while depositing the aerosol ink on the component using the print head.

17. The system of claim 14, wherein the printing environment parameter is an ambient temperature, an ambient humidity, or both of the printing environment.

18. The system of claim 14, wherein the printing environment parameter includes an ambient temperature and an ambient humidity of the printing environment.

19. The system of claim 14, wherein the printing environment parameter further includes an atmospheric composition of the printing environment.

20. The system of claim 14, wherein in depositing the aerosol ink on the component using the print head the control system is configured to cause the system to deposit the aerosol ink on the component in a triple path configuration.

* * * * *